United States Patent [19]

Shiio et al.

[11] Patent Number: 5,491,743
[45] Date of Patent: Feb. 13, 1996

[54] VIRTUAL CONFERENCE SYSTEM AND TERMINAL APPARATUS THEREFOR

[75] Inventors: Ichiro Shiio, Yokohama; Makoto Kobayashi, Kawasaki, both of Japan

[73] Assignee: International Business Machines Corporation, Armonk, N.Y.

[21] Appl. No.: 248,117

[22] Filed: May 24, 1994

[51] Int. Cl.$^6$ ............................. H04N 7/12; H04N 11/00
[52] U.S. Cl. .............................. 379/202; 348/14; 348/15; 348/16; 348/578; 395/154
[58] Field of Search ................................. 348/14, 15, 16, 348/578, 19, 26, 61, 577

[56] References Cited

U.S. PATENT DOCUMENTS 5,347,306  9/1994  Nitta ............................. 348/15

Primary Examiner—Jeffery Hofsass
Assistant Examiner—Thomas F. Presson
Attorney, Agent, or Firm—Jonathan E. Jobe, Jr.; Craig J. Yudell; Andrew J. Dillon

[57] ABSTRACT

A terminal apparatus for a virtual conference system comprises: a display means for displaying a virtual conference room used for holding a virtual conference, and for displaying, in the virtual conference room, animated characters representing attendants at the virtual conference; an indication means for indicating an action of an animated character representing the user; an information output means for outputting action information for the animated character representing the user indicated by the indication means; and character control means for actuating the other animated characters in accordance with input action information for the other animated characters, and for actuating the animated character representing the user in accordance with the indicated action.

6 Claims, 10 Drawing Sheets

VIRTUAL CONFERENCE SYSTEM AND TERMINAL APPARATUS THEREFOR

BACKGROUND OF THE INVENTION

1. Technical Field

The present invention relates in general to a virtual conference system and a terminal apparatus therefor. In particular, the invention relates to a virtual conference system terminal apparatus used for holding a virtual conference and a virtual conference system for holding a virtual conference using a plurality of virtual conference system terminal apparatuses connected to each other via communication lines such as telephone lines.

2. Description of the Related Art

Conventionally, as shown in Japanese Patent Application 4-140990 there exists a visual telephone conference system in which a conference is constituted by attendance of a plurality of users at remote locations by connecting their terminal apparatuses using communication lines. According to this system, a user terminal apparatus to enable attendance at a visual telephone conference is equipped with a visual telephone set and a remote image transmission circuit. A conference can be held by displaying images of attendants in respective divided areas of a monitor screen of each terminal apparatus.

However, in the above conference system, to display faces of attendants on each terminal apparatus, video images obtained by photographing the faces of attendants are transmitted to the respective user terminal apparatuses. Since the video images thus taken have an enormous information quantity, time is required to input and output the video images, which are irrelevant to the progress of a conference. In addition, it is necessary to convert the transmitted signals to images. Therefore, this system has problems in that a conference hardly proceeds on a realtime basis and that each user terminal apparatus is costly, In each user terminal apparatus, attendants can be recognized easily by display of their faces in the respective divided areas of the screen. However, mere display of the faces cannot reflect an atmosphere of a conference, and cannot express various states that will occur in an actual conference.

SUMMARY OF THE INVENTION

Therefore, the present invention has an object of providing a virtual conference system and a terminal apparatus therefor which allows a conference to proceed in an intuitive, clear, and effective manner.

According to the present invention, to attain the above object, a terminal apparatus for a virtual conference system comprises: a display means for displaying a virtual conference room used for holding a virtual conference, and for displaying, in the virtual conference room, animated characters representing attendants at the virtual conference; an indication means for indicating an action of an animated character representing the user; an information output means for outputting action information for the animated character representing the user indicated by the indication means; and character control means for actuating the other animated characters in accordance with input action information for the other animated characters, and for actuating the animated character representing the user in accordance with the indicated action.

According to another preferred embodiment, a terminal apparatus for a virtual conference system comprises: a display means for displaying a virtual conference room used for holding a virtual conference, and for displaying, in the virtual conference room, animated characters representing attendants at the virtual conference; an indication means for indicating an action of an animated character representing the user; an information output means for outputting action information for the animated character representing the user indicated by the indication means; a management means for determining an animated character to be actuated based on input action information for the other animated characters and the indicated action of the animated character representing the user, and for assigning an action right to the determined animated character; and a character control means for actuating the right-assigned animated character in accordance with at least one of the input action information for the other animated characters and the indicated action of the animated .character representing the user.

The terminal apparatus for a virtual conference system according to the invention comprises display means, indication means, information output means, and character control means. The display means displays a virtual conference room used for holding a virtual conference together with furnishings such as a desk, and also displays, in the virtual conference room, own and the other animated characters representing attendants at the virtual conference. The indication means indicates an action of an animated character representing the user, such as raising a hand to request to talk or a movement. The information output means outputs the indicated action information for the animated character representing the user. The character control means controls the other animated characters displayed on the display means so that they act in accordance with the input action information for the other animated characters, and controls the animated character representing the user so that it acts in accordance with the indicated action.

The virtual conference system is constructed by connecting to each other a plurality of terminal apparatuses for the virtual conference system described above so that the action information can be input to each terminal apparatus. Therefore, the action information of each terminal apparatus for a virtual conference system is exchanged between the user's and the other terminal apparatuses of the virtual conference system and between the other terminal apparatuses of the virtual conference system. As a result, the action information for the user's character that is indicated by the user so as to effect, for instance, raising a hand for requesting to talk concerning a subject of discussion, or movement of the animated character in the conference room is sent to the other terminal apparatuses for a virtual conference system connected to the user terminal. The action information for the animated character associated with another terminal apparatus for the virtual conference system that is indicated by the operator of that terminal apparatus is sent to the other terminal apparatuses for the virtual conference system, including the user terminal apparatus. As a result, the animated characters are displayed in the same manner in the user terminal apparatus for the virtual conference system and the other terminal apparatuses for the virtual conference so as to act in accordance with the conference state collectively intended by the operators, the state of which includes the raising of hands for requesting to talk about a subject under discussion and movement in the conference room. Thus, the respective operators can actuate the corresponding animated characters in the conference room displayed on the display means in accordance with a conference state by using their terminal apparatuses for a virtual conference system, so that the virtual conference can proceed so as to reflect the conference state intended by the operators.

The invention further comprises a management means and a character control means. The management means determines an animated character to be actuated based on input action information for the other animated characters and the indicated action of the animated character representing the user, and assigns the right of action to the user associated with the determined animated character. The character control means actuates the right-assigned animated character in accordance with the input action information for the other animated characters and the indicated action of the animated character representing the user.

The virtual conference system is constructed by connecting a plurality of terminal apparatuses for a virtual conference system with each other so that the action information can be input to each terminal apparatus. In each terminal apparatus for a virtual conference system, the animated character is actuated which has been assigned the right of action with a judgment based on the priorities such as predetermined order of the attendants, etc., that must be actuated. Therefore, for example, even when more than one user request to speak at the same time, only one user is allowed to speak, and the conference can proceed smoothly.

In another preferred embodiment, the virtual conference system is constructed by connecting a plurality of terminal apparatuses for a virtual conference system to a central control apparatus. The central control apparatus receives action information such as information of a speech concerning a subject of discussion from one or a plurality of terminal apparatuses for a virtual conference system. The central control apparatus determines an animated character to be actuated based on the priorities such as predetermined orders of the attendants, and sends permission information to the terminal apparatus for a virtual conference system corresponding to the determined animated character. Upon receiving the permission information corresponding to the output action information from the central control apparatus, the terminal apparatus for a virtual conference system actuates the animated character representing the user in accordance with the indicated action. Furthermore, the other terminal apparatus actuates the corresponding animated characters in accordance with the input action information. In this manner, the action rights requested by the respective terminal apparatuses for a virtual conference system are managed by the central control apparatus.

In a conference, the attendants are allowed to make a speech, and sometimes allowed to discuss only within a subgroup. To deal with the above situations, the terminal apparatus for a virtual conference system according to the invention comprises the information output means which converts an input voice to voice information for the animated character representing the user, and outputs the voice information together with action information such as the current speaker or the speech subgroup for the animated character representing the user indicated by the indication means. The voice output means determines whether or not to output a sound based on input action information such as the current speaker speech or the speech subgroup for the other animated characters, and outputs the voice based on the voice information when it is required. The character control means actuates the other animated characters in accordance with the input action information such as the current speaker or the speech subgroup for the other animated characters, and actuates the animated character representing the user in accordance with the indicated action. The actions of an animated character include change of the mouth pattern.

When the user speaks, the animated character in the user's own terminal apparatus for a virtual conference system, for instance, moves its mouth to indicate speech, and the same animated character in the other terminal apparatuses for a virtual conference system acts in the same way. The voice information is sent to the respective terminal apparatuses for a virtual conference system so as to be heard, for instance, only by the related attendants only, or by all the attendants, in accordance with the indicated action information such as the current speaker or the speech subgroup. Therefore, in the case of speech subgroup, the users in the subgroup can communicate with each other and the corresponding animated characters can be actuated. For the users outside the subgroup, the mouths of the animated characters in the subgroup move but they can not hear the voice. With this constitution, the user can actuate the associated animated character according to the voice input, and the content of the voice can be transmitted only to the intended users. Therefore, the voice status in the conference, such as who is speaking and who is making a speech to a subgroup, is expressed by both the display information and the voice information so that a conference can proceed in accordance with the atmosphere of a conference room.

The above as well as additional objects, features, and advantages of the present invention will become apparent in, the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
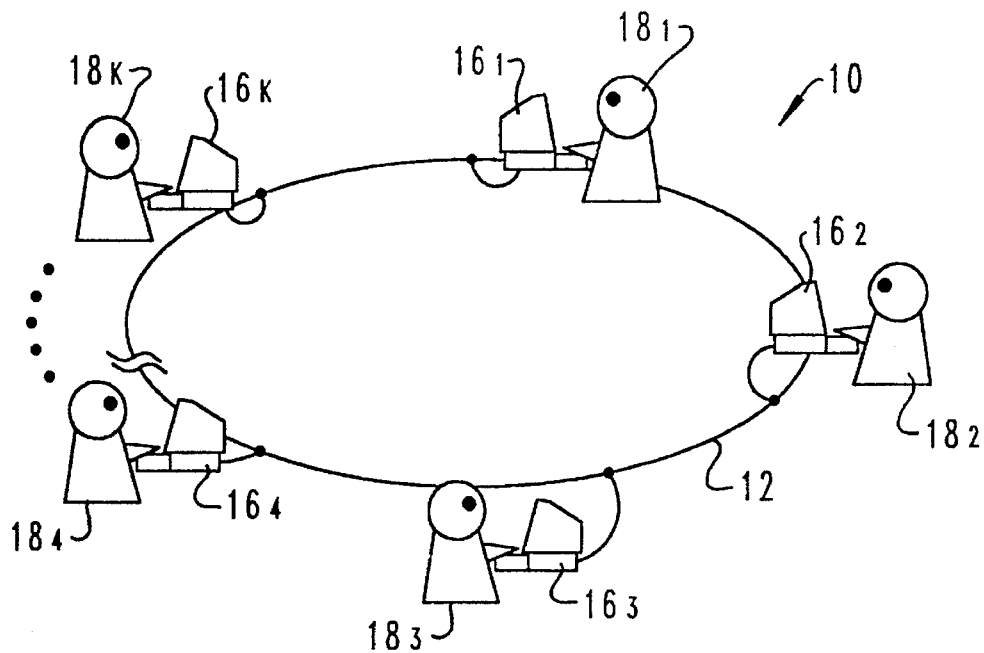
FIG. 1 is a schematic diagram showing the constitution of a virtual conference system according to a first embodiment.

As shown in FIG. 1, a virtual conference system 10 according to a first embodiment consists of a ring-like network 12 capable of transmitting and receiving a digital signal and K (natural number) user terminal apparatuses $16_1$–$16_K$ connected to the network 12. In the virtual conference system 10, transmission data (see Table 1 below) is transmitted through the network 12. The user terminal apparatuses $16_1$–$16_K$ are operated by respective operators $18_1$–$18_K$. The network 12 is not limited to the above network (Ethernet, a token-ring network, etc.) but may be configured in such networks as a public telephone network or an ISDN, or a combination of these networks.

Figure 2:
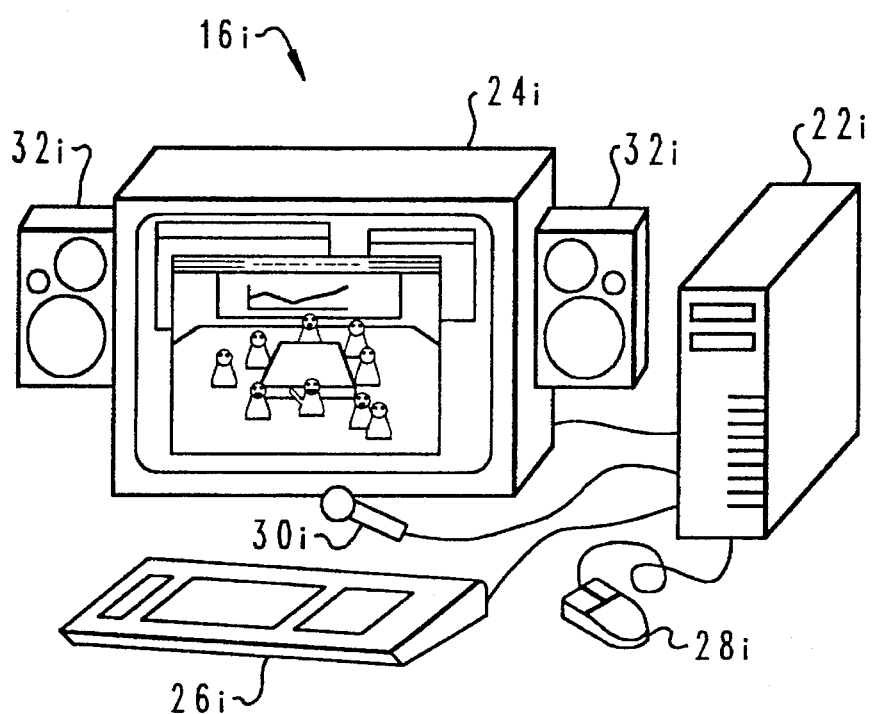
FIG. 2 is a schematic diagram showing the constitution of one user terminal apparatus of the first embodiment.

As shown in FIG. 2, the user terminal apparatus $16_i$ ($1 \leq i \leq K$) consists of a personal computer (hereinafter abbreviated as PC) $22_i$, a display $24_i$, a keyboard $26_i$, a mouse $28_i$, a microphone $30_i$, and a pair of speakers $32_i$. The microphone $30_i$ and the pair of speakers $32_i$ can be replaced with a headset of a telephone etc. or a handset. The pair of speakers $32_i$ may be used with a both-side arrangement so as to provide a stereo effect. Three or more speakers may be used for multichannel reproduction, and one speaker may be used for monaural reproduction. In addition to the above constitution, input/output devices such as a digitizer, printer, and scanner may be employed.

Figure 3:
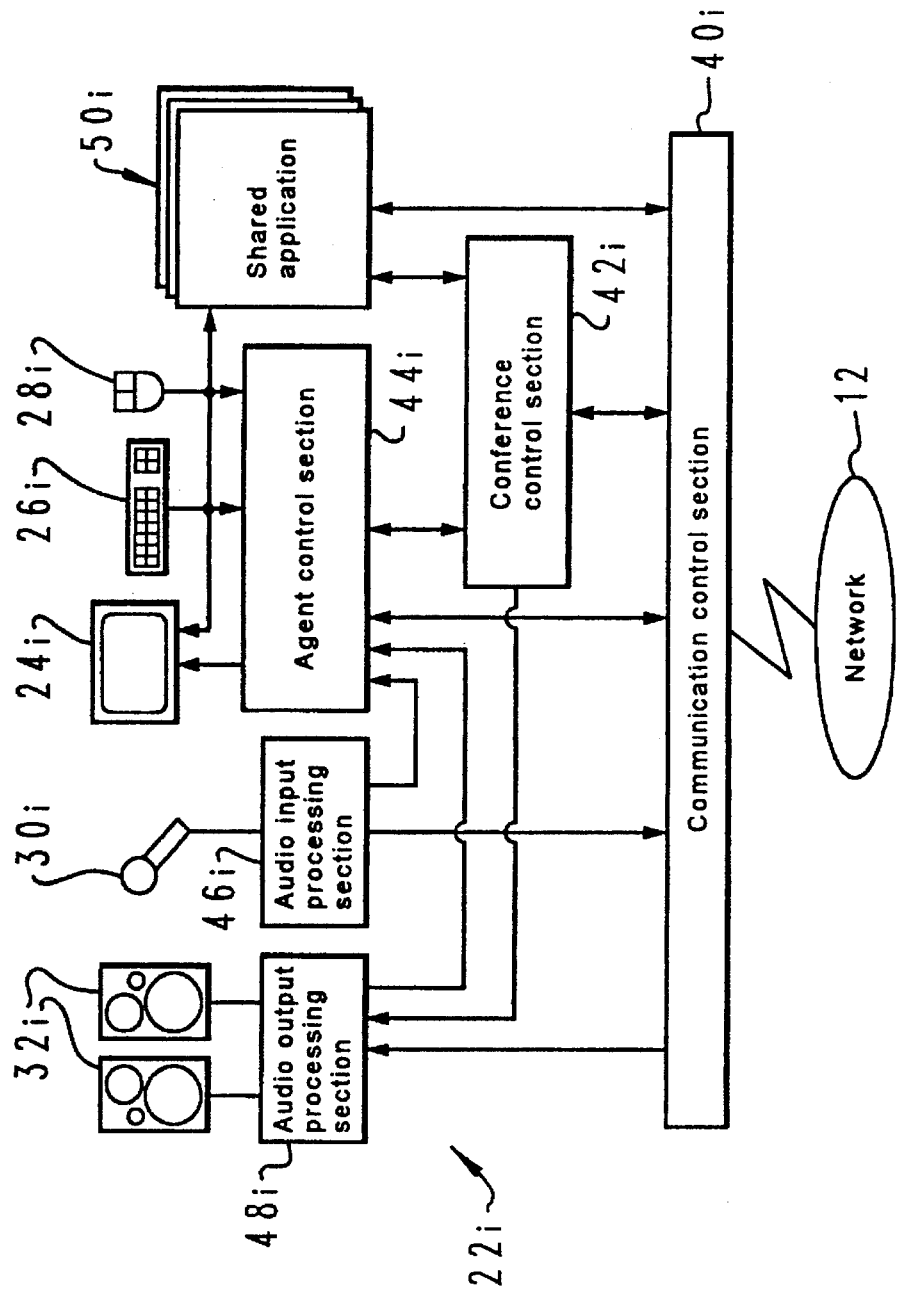
FIG. 3 is a block diagram schematically showing the internal constitution of a computer of the user terminal apparatus of the first embodiment.

FIG. 3 is a functional block diagram showing the general internal constitution of the PC $22_i$. The PC $22_i$ includes a communication control section $40_i$ for mutually communicating data etc., with the other PCs $22_j$ ($1 \leq j \leq K$, i≠j), a conference control section $42_i$ for controlling generation and termination of the virtual conference room (hereinafter simply called "conference room") on the plurality of user terminal apparatuses and conference operation such as entrance and exit of attendants, and an agent control section $44_i$ for controlling a virtual conference room window 62 (see FIG. 5) in which an overall view of the conference room and display etc., of animated characters (hereinafter called "agents") representing operators in the virtual conference room window 62. The PC $22_i$ also includes an audio input processing section $46_i$ for converting sound received by the microphone $30_i$ to a digital signal, and an audio output processing section $48_i$ for converting digital audio signals sent from the other PCs $22_j$ to analog signals. The PC $22_i$ further has a shared application section $50_i$ for storing programs such as shared chalkboard, where attendants of the conference type in text and draw pictures.

The communication control section $40_i$ is connected to the network 12 and to the conference control section $42_i$, agent control section $44_i$, shared application section $50_i$, audio input processing section $46_i$, and audio output processing section $48_i$. The conference control section $42_i$ is connected to the shared application section $50_i$, agent control section $44_i$, audio input processing section $46_i$, and audio output processing section $48_i$. The shared application section $50_i$ is connected to the display $24_i$, keyboard $26_i$, and mouse $28_i$, all of which are connected to the agent control section $44_i$. The agent control section $44_i$ is connected to the audio input processing section $46_i$ and audio output processing section $48_i$. The microphone $30_i$ is connected to the audio input processing section $46_i$, and the speakers $32_i$ are connected to the audio output processing section $48_i$.

The transmission data of a format shown in Table 1 below is exchanged between the respective control sections of the PC described above and between the respective user terminal apparatuses $16_j$ ($1 \leq j \leq K$, i≠j).

TABLE 1

| Sender ID | Receiver ID | Control section ID | Data specific to each control section |
|---|---|---|---|

As described below, the transmission data consists of an ID portion (identification portion) and a data portion. The ID portion consists, in the following order, of a sender ID indicating a user terminal apparatus of the sender of the transmission data, a receiver ID indicating a user terminal apparatus of the receiver of the transmission data, and a control section ID indicating a control section of the user terminal apparatus to which the transmission data is applied. The data portion contains data specific to each control section, i.e., specific data generated by each control section of the PC $22_i$.

Examples of the data specific to each control section are data transmitted from the agent control section $44_i$, which data indicates such states as a position of the associated agent, a direction of his/her face, opening and closing of his/her mouth, and hand raising. The agent control section $44_i$ receives a signal necessary to perform control of opening and closing the agent's mouth in accordance with the magnitude of voice that is input from the audio input processing section $46_i$.

The data specific to the transmission data output from the conference control section $42_i$ includes data respectively indicating attendance at the conference, withdrawal from the conference, a request for operation rights, and permission for operation rights. The data specific to the transmission data output from the audio input processing section $46_i$ includes audio data produced by digitizing and compressing sound that is through the microphone $30_i$.

The conference control section $42_i$ performs such operations as processing a request for generating or terminating a conference, and receiving a request for speaking rights (described later) from the agent control section $44_i$ and performing an operation of accepting that request while communicating with the conference control sections $42_j$ of the other user terminal apparatuses. Furthermore, the conference control section $42_i$ sends such data as new attendance at the conference and replacement of an operator having the operation right of application to the agent control section $44_i$ and the shared application section $50_i$ so that the contents of those sections are updated in a synchronized manner.

Figure 4:
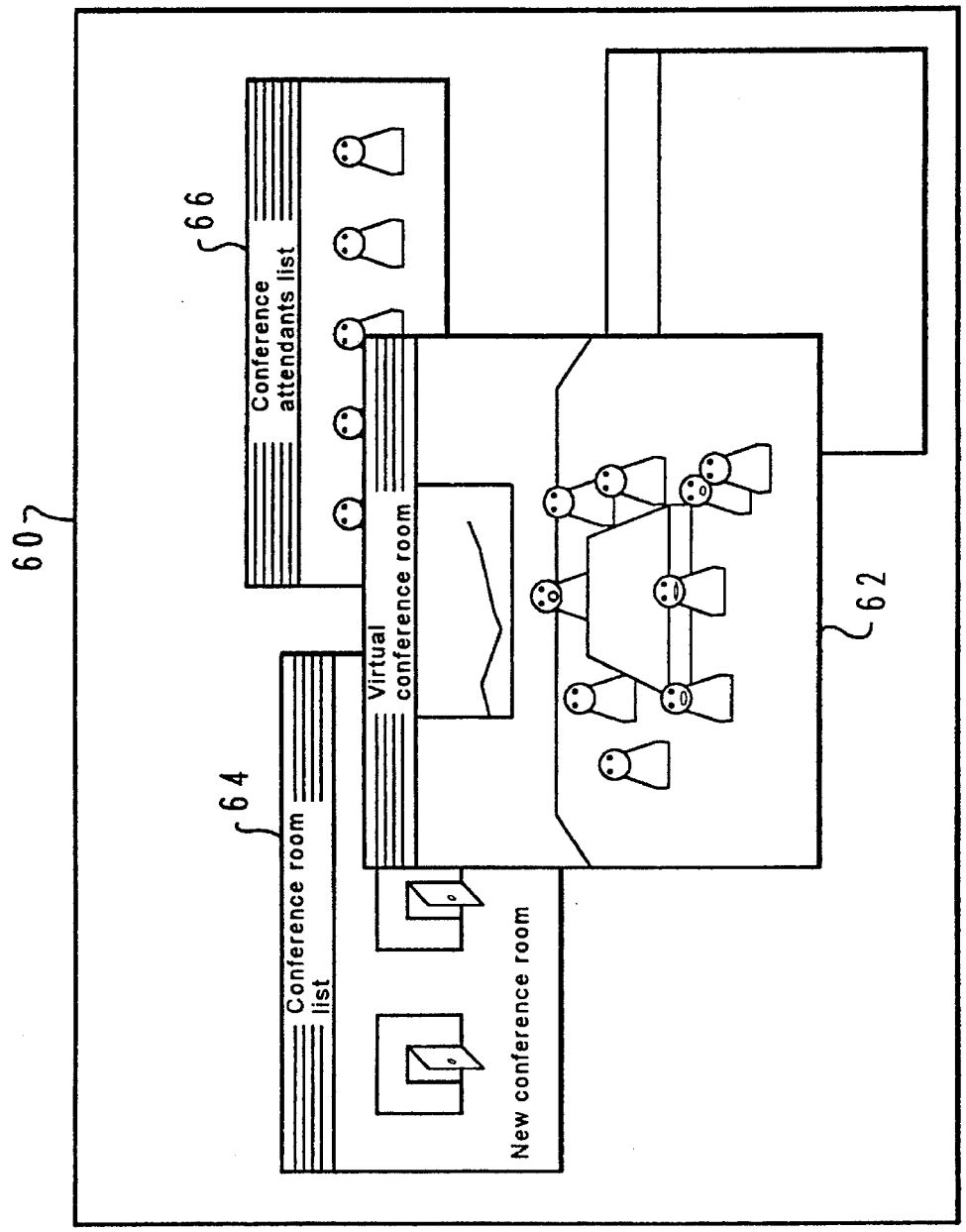
FIG. 4 is an image of a display screen displayed on a display of the user terminal apparatus.

Next, a description will be made of how this embodiment operates. When the operator $18_i$ of the user terminal apparatus $16_i$ selects a processing menu item (not shown:) to perform a conference, a virtual conference room window 62 showing the overall view of a conference room pops up on the display screen 60 of the display $24_i$ of the user terminal apparatus $16_i$ as shown in FIG. 4. A conference room list window 64 showing a list of conferences currently going on and a conference attendants window 66, in which animated characters representing attendants allowed to attend those conferences are arranged, are also displayed on the display screen 60.

Pattern images (representing the operator etc.) displayed in each window and its neighborhood also serve as an indication input portion to be indicated by the mouse $28_i$ in, for instance, selecting a subject for processing. These pattern images are hereinafter called "icons." These icons are subjected to selection indication by the clicking of the mouse $28_i$, indication execution by its double clicking, and movement (hereinafter called "dragging") of a selected icon.

The operators of all the user terminal apparatuses etc., connected to the network 12 may be displayed in the conference attendants window 66 as persons allowed to attend the conferences. Alternatively, only the selected operators may be displayed as allowable persons in accordance with the kind of conference or the application. The icons may be given a statement indicating the above fact.

To have another operator $18_j$ attend the ongoing conference, the icon representing the operator $18_j$ requesting the attendance is moved from the conference attendants window 66 to the virtual conference room window 62 by dragging it with the mouse $28_i$. In response to this drag, the agent control section $44_i$ sends transmission data including the attendance request to the agent control section $44_j$ of the corresponding user terminal apparatus $16_j$ via the communication control section $40_i$ and the network 12. In the attendance-requested user terminal apparatus $16_j$, the agent control section $44_j$ has an attendance request window (not shown) which asks for a judgment as to whether to attend the conference displayed on the display $24_j$ of the user terminal apparatus $16_j$.

The user terminal apparatus $16_i$, which requests the attendance of another operator $18_j$, finishes the attendance request procedure if the agent control section $44_i$ receives data indicating the refusal of attendance of another operator $18_j$ or receives no response from the user terminal apparatus $16_j$ because of no operation on it or the absence of the operator (after a lapse of a predetermined period that is found by use of a timer etc.).

When another operator $18_j$ accepts the attendance, transmission data, including data indicating the acceptance of attendance, is returned to the agent control section $44_i$ of the attendance requesting user terminal apparatus $16_i$. In this case, the agent control section $44_i$ on the requesting side sends transmission data, including data indicating the attendance of the new operator at the conference, to the conference control section $42_i$. In response, the conference control section $42_i$ forwards the transmission data to the agent control section $44_i$ and the application section $50_i$. The application section $50_i$ performs an operation to transmit data etc., necessary to build up the application section $50_j$ in the user terminal apparatus $16_j$ of the newly attending operator $18_j$ with the same contents as the application section $50_i$. Furthermore, the conference control section $42_i$ sends transmission data to the agent control section $44_i$ so that the agent $20_j$ representing the new operator is added to the conference room.

Figure 5:
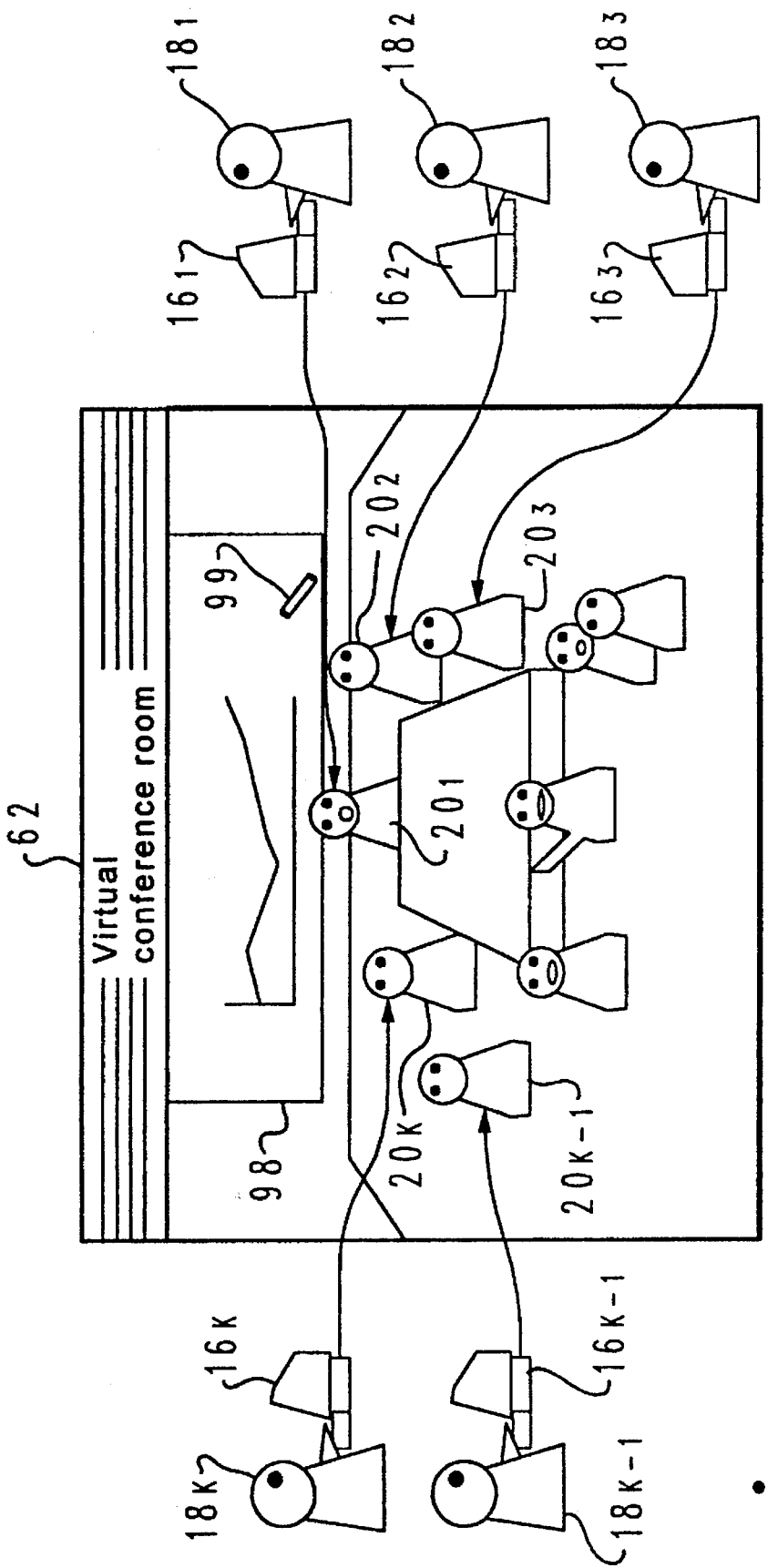
FIG. 5 is an image of a virtual conference room window displayed on the display of the user terminal apparatus.

As shown in FIG. 5, there are displayed in the virtual conference room window 62 objects representing furnishings for a conference operation such as a desk, a shared chalkboard 98, a piece of chalk 99, a microphone and a platform, and all the agents $20_1$–$20_K$ representing the operators (attendants) $18_1$–$18_K$ operating the respective user terminal apparatuses $16_1$–$16_K$ connected to the network 12 and currently attending the conference. Details of those will be described later.

To actually hold a conference, the icon of the new conference room in the conference room list window 64 is double clicked or an appropriate selection is made from a menu (not shown) through the keyboard $26_i$. In response, the agent control section $44_i$ sends transmission data, including data indicating a conference holding request, to the conference control section $42_i$. Furthermore, the agent control section $44_i$ controls the display of the virtual conference room window 62 in the display screen 60 of the display $24_i$ and the furnishings such as the agents, desk, and microphone used in the conference that are displayed in the virtual conference room window 62. This display includes the movement (described later) of the agents and the furnishings.

Upon reception of transmission data from the agent control section $44_i$, the conference control section $42_i$ generates a new conference and registers it in the user terminal apparatus $16_i$. Furthermore, the conference control section $42_i$ sets the operator $18_i$ as an attendant of the conference and sends transmission data including data indicating a conference attendance request to the agent control section $44_i$. As a result, the virtual conference room window 62 showing a conference room is poped up, and the agent $20_i$ representing the operator $18_i$ herself is displayed in the virtual conference room window 62.

When her attendance is permitted and operator $18_i$ intends to attend the currently ongoing conference, she doubly clicks the icon representing that conference displayed in the conference room list window 64 (see FIG. 4). In response, the procedure similar to that in the above-described case of the acceptance of attendance is initiated, so that the agent $20_i$ of the operator $18_i$ is added to the currently ongoing conference room.

To move the agent $20_i$ of the operator $18_i$ to simulate an event in which she speaks at the top seat, the agent $20_i$ is dragged to that position in the virtual conference room window 62. While depression of the drag continues until the agent $20_i$ reaches the destination, an animation is effected such that the leg patterns of the agent $20_i$ move alternately to simulate walking. Data indicating the state, position, etc., of this action is sent to the user terminal apparatuses of all the conference attendants via the communication control section $40_i$, from the agent control section $44_i$, so that the position and the leg patterns of the agent $20_i$ change in the same manner on the display of each user terminal apparatus.

Figure 6:
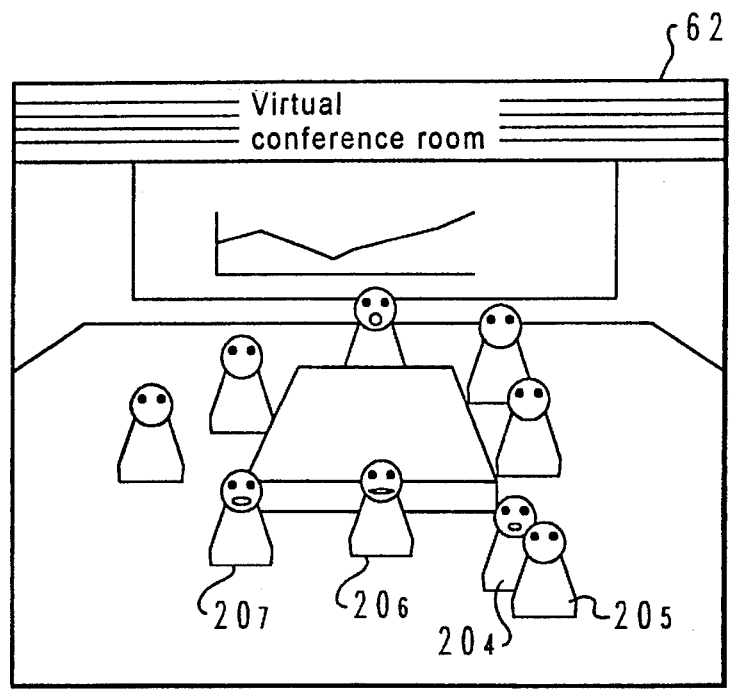
FIG. 6 is an image illustrating patterns indicating actions of agents in the virtual conference room window.

Data indicating the new position (destination) of the agent $20_i$ is sent to the audio output processing section $48_i$, which performs a voice-related operation so that voices from the other agents displayed in the virtual conference room window 62 are heard in a manner (magnitude and balance of voices) in accordance with the new positional relationships between (i.e., distances from) them. The voice-related operation is not limited to the one in accordance with the positional (i.e., physical) relationships. For example, when the agents $20_4$ and $20_5$ are overlapped with each other as shown in FIG. 6, the privacy mode can be established in which a voice exchange is effective only between the two agents $20_4$ and $20_5$ irrespective of the positional relationships between the respective agents. In this case, the attendants other than the two corresponding to the agents $20_4$ and $20_5$ can realize from the mouth movements of the agents $20_4$ and $20_5$ that the two attendants are on privacy to each other though they cannot know the content of the conversation.

When the operator $18_i$ speaks, the state of his speech is detected by the audio input processing section $46_i$. For example, the audio input processing section $46_i$ detects the magnitude of this voice and sequentially sends detection results to the agent control section $44_i$. The audio output processing section $48_i$ performs a synthesizing operation on audio data transmitted from the user terminal apparatus $16_j$ of another operator $18_j$ in accordance with the positional relationships with the respective agents and occurrence/non-occurrence of the privacy state in the agent control section $44_i$ so that the magnitudes and right/left directions of the voices of the other operators $18_i$ are appropriate to the operator $18_i$. Then, the result is output from the speaker $32_i$.

The agent control section $44_i$ changes the shape of the mouth of the agent $20_i$ in accordance with the voice input, for instance, opening the mouth widely for a loud voice (see the agent $20_7$ shown in FIG. 6). This change is sent to the user terminal apparatuses of the other attendants. As a result, an animation is displayed in which the mouth of the agent $20_i$ of the speaking operator $18_i$ opens and closes so as to indicate his speech.

During the conference, the pattern of the agent $20_i$ can be changed to express hand raising (see FIG. 5) by an operation of the keyboard $26_i$ or mouse $28_i$. By the hand raising, the operator $18_i$ can request to talk and express his agreement with a subject of the discussion. Data indicating hand raising is sent to the audio output processing section $48_i$. As a result, the voice of the hand-raising attendant is processed so that the other attendants uniformly hear his voice as a loud one.

By changing the pattern of the agent $20_i$, in the progress of the conference, various indications of intention and actions of entrance/exit, a nod, a change of direction, etc., as well as the above-described movement, hand raising, and privacy can be expressed.

Next, an example of processing by the shared application section $50_i$ will be described. Operation rights of elements of the shared application section $50_i$, such as the shared chalkboard 98 and a shared spread sheet, can be expressed by preregistered expression methods. For example, operation rights for the shared chalkboard 98 are associated in advance with the chalk piece 99 in the conference room (see FIG. 5). The operator $18_i$ requests operation rights for the shared chalkboard 98 by selecting the chalk piece 99 by doubly clicking the mouse $28_i$. Transmission data indicating this request is sent from the agent control section $44_i$ to the conference control section $42_i$, which sends data requesting acceptance to the conference control sections $42_j$ of the user terminal apparatuses $16_j$ of the other attendants. The conference control section $42_i$ determines whether the request for the operation right has been accepted based on acceptance judgment data sent from the other conference control sections $42_j$ according to a standard of decision by majority, unanimity, etc. The other conference control sections $42_j$ also perform processing of this determination. When the determination of permitting the request for operation rights has been made, the conference control section $42_i$ sends data indicating the permission for operation rights for the shared chalkboard 98 to the agent control section $44_i$ and the application of the shared chalkboard 98.

It should be considered that there may exist contending requests for operation rights for a shared application. In the above example of the shared chalkboard 98, contention may occur when a plurality of operators simultaneously request operation rights of the shared chalkboard 98. To cope with this problem, a turns-taking scheme is introduced in permitting the operation right by properly allocating priorities of permission (for instance, on a first-come-first-served basis). Data indicating permission for operation rights and the turn of waiting for permission is sent to the shared chalkboard 98 and the agent control sections of the operators requesting permission and waiting their turns. Based on this data, the agent control sections change the pattern of the agent representing the permitted operator so that it takes the chalk piece 99, and changes the pattern of the waiting agents so that they move to the side of the chalk piece 99 and wait their turns. To prevent erroneous input, an application program of the shared chalkboard 98 sends data which enables input through the keyboard and mouse of the permitted operator and disables input from the non-permitted operators.

In addition to the above, there are control operations for the chairperson seat, the speaker seat, the microphone location, etc. In any case, one, or a predetermined number of persons, can occupy that location. The operation right corresponds to a right of occupying that location, which is assigned in the mechanism described above. The voice of an operator occupying the chairperson seat, speaker seat, or microphone location is transmitted as data for producing a loud voice to be heard by all the attendants, as in the above-described case of a speech with a hand raised.

Figure 7:
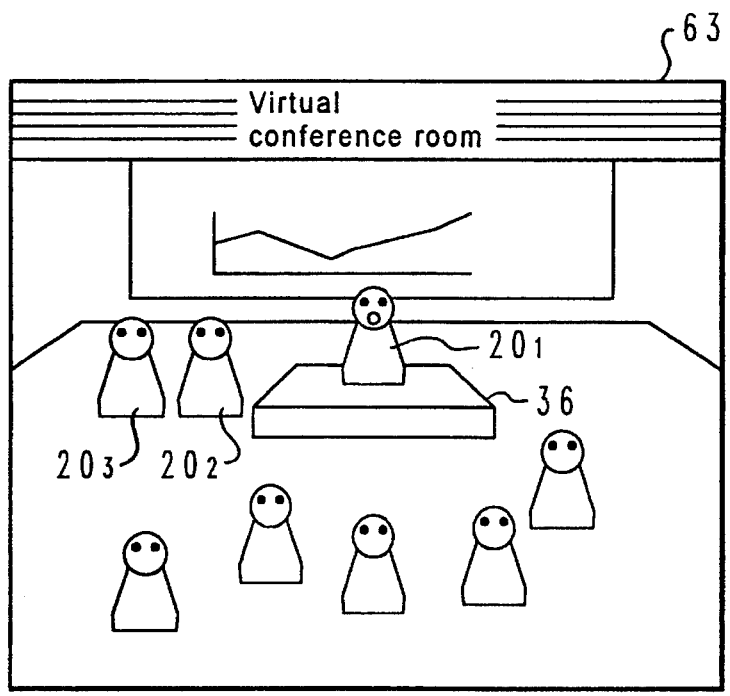
FIG. 7 is an image of another virtual conference room window in the first embodiment.

Another example of resolving contending requests for an operation right is described below with reference to FIG. 7. FIG. 7 shows a conference room window 63 representing a typical conference such as a morning gathering having only one speaker. A platform 36, which can be occupied by only one person, is provided in this conference room, and setting is so made that the voice of only the operator corresponding to an agent $20_1$ occupying the platform 36 is transmitted to all the other attendants at the gathering. In this manner, the contention of requests for speaking rights can be avoided in the progress of a conference. Furthermore, with respect to the above-mentioned order of speeches of a plurality of operators, data indicating the order is produced as a queue (representing agents $20_2$ and $20_3$ in this example) and transmitted. As a result, the agents representing the speaker and the waiting attendants are displayed in the virtual conference window 63 so as to visually express the situation.

As described above, according to this embodiment, since the attendants of a conference as well as its environment, such as furnishings, are displayed in the form of the agents representing the operators and the display data in the respective user terminal apparatuses connected to each other through the network, the data amount does not become enormous unlike the case of transmitting image data, and thus the communication load can be reduced. Since indications of intentions and actions occurring in the progress of a conference can be expressed by changes of agent patterns, a conference can proceed while the same situation as in the case of holding an actual conference by calling attendants is realized by the data input/output corresponding to the changes of the patterns. Furthermore, the reduction of the data amount enables the realtime progress of a conference.

Figure 8:
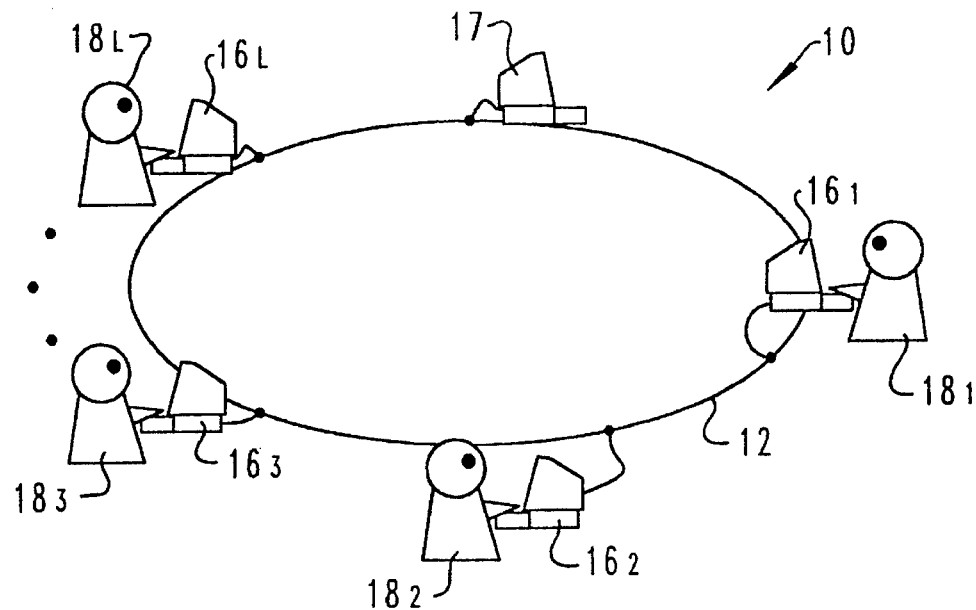
FIG. 8 is a schematic diagram showing the constitution of a virtual conference system according to a second embodiment.

A second embodiment will be hereinafter described. Since the second embodiment is similar to the first embodiment, only the different portions will be described below. The parts in the second embodiment that are the same as the corresponding parts in the first embodiment are given the same reference symbols and detailed descriptions thereof will be omitted. As shown in FIG. 8, a virtual conference system 10 according to the second embodiment consists of an central control apparatus 17 and L (natural number) user terminal apparatuses $16_1$–$16_L$ all of which are connected to a network 12.

Figure 9:
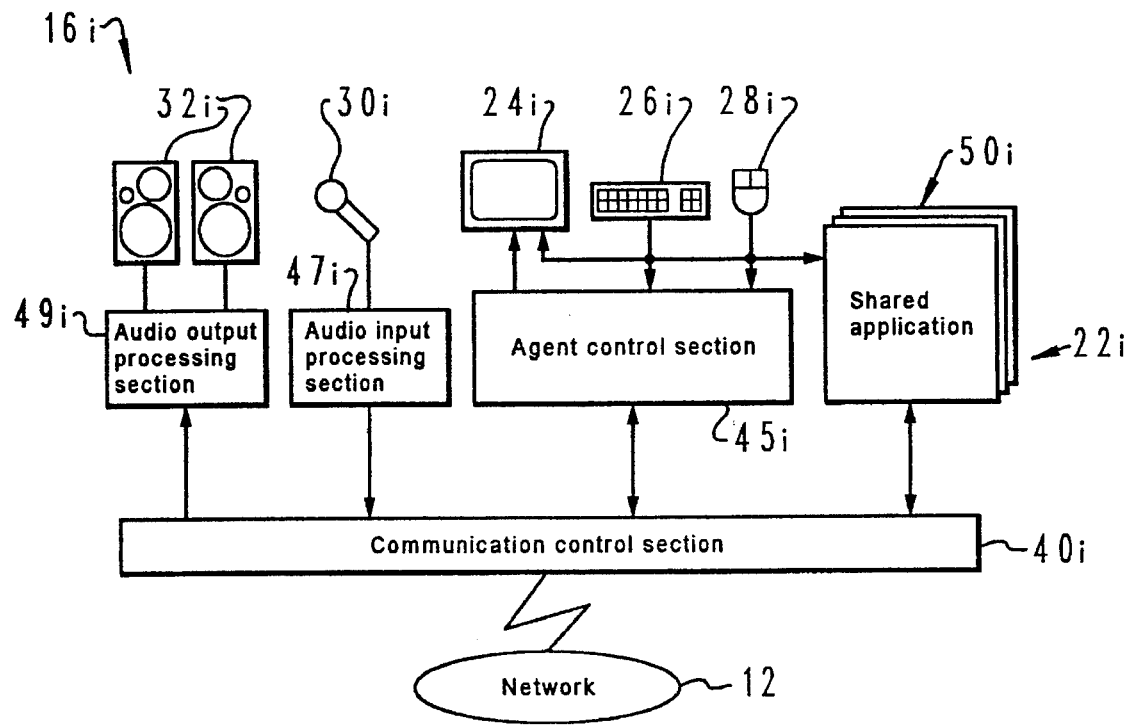
FIG. 9 is a block diagram schematically showing the constitution of one user terminal apparatus of the second embodiment.

As shown in FIG. 9, a PC $22_i$ of the user terminal apparatus $16_i$ ($1 \leq i \leq L$) consists of a communication control section $40_i$, an agent control section $45_i$, an audio input processing section $47_i$, an audio output processing section $49_i$, and a shared application section $50_i$. The communication control section $40_i$ is connected to the network 12 and also connected to the agent control section $45_i$, audio input processing section $47_i$, audio output processing section $49_i$, and shared application section $50_i$. In this embodiment, since the central control apparatus 17 controls a virtual conference. Thus, in the PC $22_i$ no conference control section is used and the audio input processing section $47_i$ merely converts an input audio signal to a digital signal and the audio output processing section $49_i$ merely converts an input digital audio signal to an analog signal.

Figure 10:
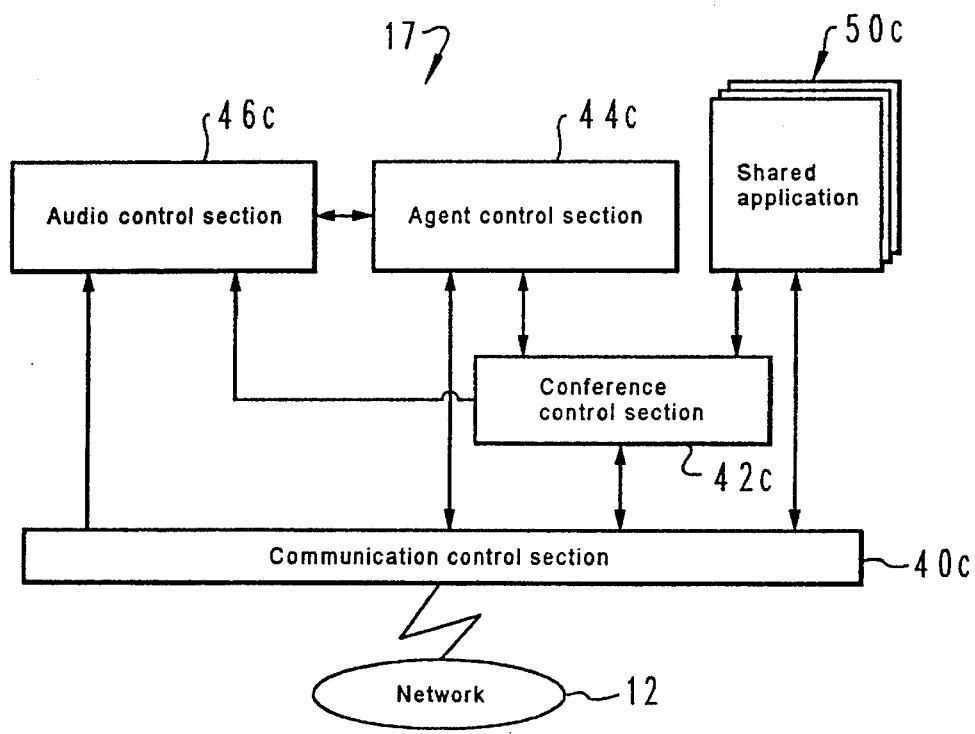
FIG. 10 is a schematic diagram showing the constitution of an central control section of the second embodiment.

As shown in FIG. 10, the central control apparatus 17 consists of a communication control section 40C, a conference control section 42C, an agent control section 44C, an audio control section 46C, and a shared application section 50C. The communication control section 40C is connected to the network 12 and also connected to the conference control section 42C, agent control section 44C, audio control section 46C, and shared application section 50C. The conference control section 42C is connected to the agent control section 44C, audio control section 46C, and shared application section 50C.

The agent control section 44C processes internal data indicating such states as positions and patterns of the agents without directly controlling the display and the input and output devices. When the position of an agent is to be changed, the agent control section 44C sends the above data to the audio control section 46C. Since the conference control section 42C and the shared application section 50C are the same as the conference control section $42_i$ and the shared application section $50_i$ of the first embodiment, respectively, descriptions therefor are omitted here. The agent control section 44C and the shared application section 50C sends data to the respective user terminal apparatuses based on transmission data input from the conference control section 42C. The audio control section 46C synthesizes voices for the respective operators and adjusts their volumes in accordance with the positional relationships between the agents, as well as such states as speech subgroups, and related data to the respective user terminal apparatuses. Furthermore, the audio control section 46C sends the agent control section 44C data to be used for changing the agent patterns in accordance with the volume levels.

If the PC $22_i$ has the functions of the respective control sections of the PC $22_i$ described in the first embodiment and is so constructed as to be able to connect to input and output devices such as a microphone, the central control apparatus 17 can operate as a user terminal apparatus.

While the above-described transmission data is generated according to the same format (see Table 1) as in the first embodiment, no data specific to a conference control section is generated because none of the user terminal apparatuses have a conference control section. The data specific to the audio control section 46C and produced therein by synthesis etc., is included in the transmission data sent from the central control section 17.

As described above, according to this embodiment, since a virtual conference proceeds using the network to which the central control apparatus is connected, the total amount of audio packets necessary for the audio data can be reduced as explained below. In the first embodiment, on the network to which k user terminal apparatuses are connected, the transmission data output from one user terminal apparatus is directed to all of the other user terminal apparatuses. Therefore, when the operators of the k user terminal apparatuses simultaneously communicate with each other, k(k−1) audio packets are generated. On the other hand, this embodiment needs only 2k audio packets because, after receiving the audio transmission data, the central control apparatus 17 sends out the audio data synthesized for the operator's apparatus.

Figure 11:
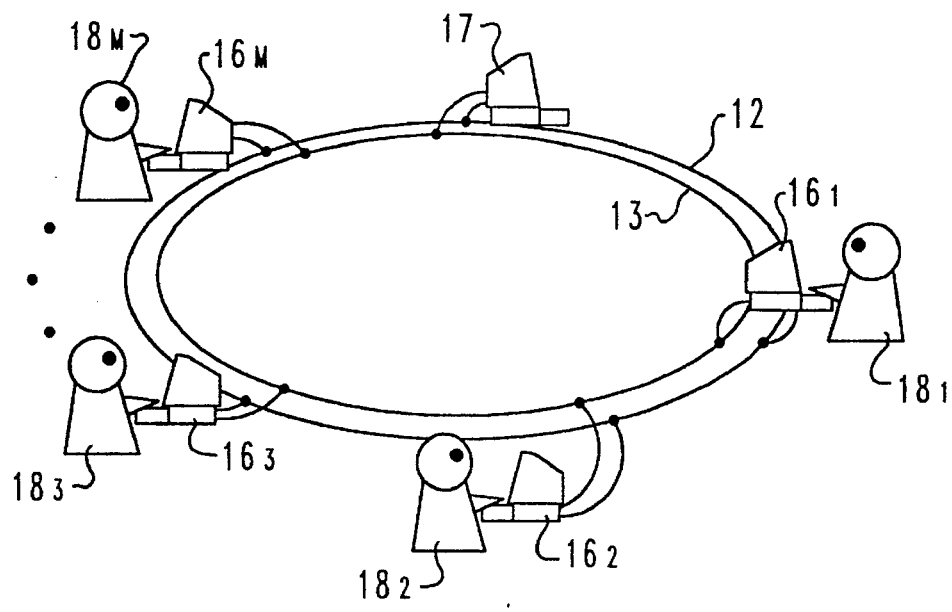
FIG. 11 is a schematic diagram showing the constitution of a virtual conference system according to a third embodiment.

A third embodiment will be hereinafter described. Since the third embodiment is similar to the above embodiment, only the different portions will be described below. The parts in the third embodiment that are the same as the corresponding parts in the above embodiment are given the same reference symbols and detailed descriptions thereof will be omitted. As shown in FIG. 11, a virtual conference system 10 according to the third embodiment consists of a central control apparatus 17 and M (natural number) user terminal apparatuses $16_1$–$16_M$ all of which are connected to the network 12 and the audio network 13.

Figure 12:
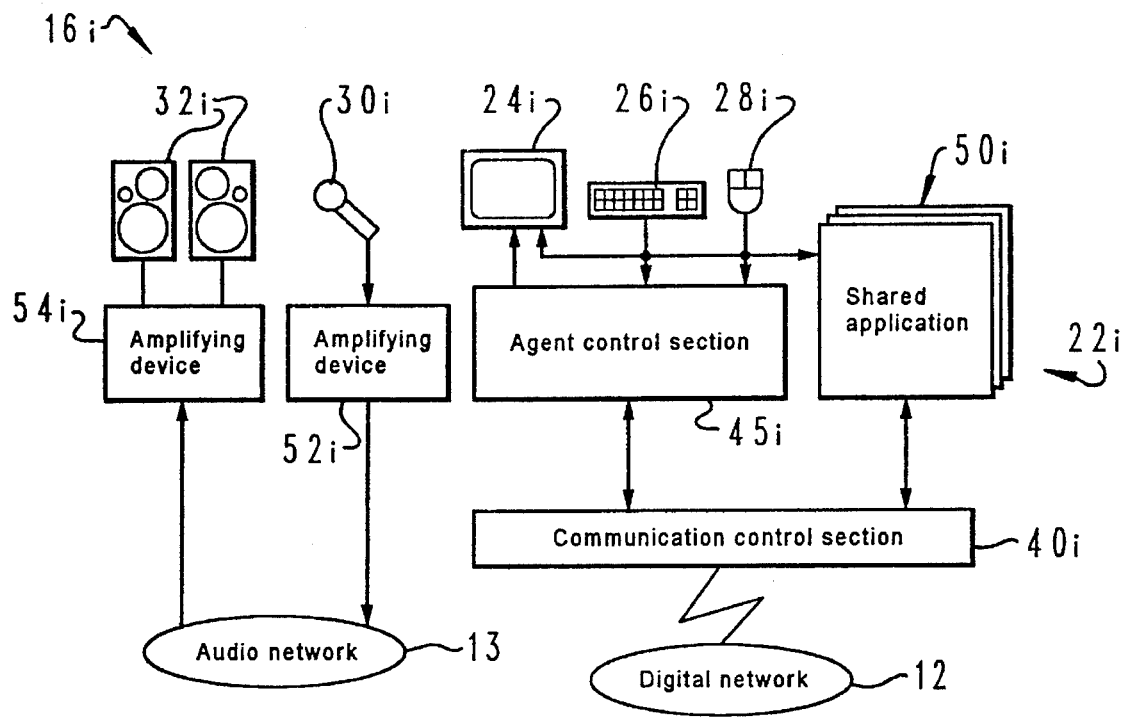
FIG. 12 is a block diagram schematically showing the constitution of one user terminal apparatus of the third embodiment.

As shown in FIG. 12, a PC $22_i$ of the user terminal apparatus $16_i$ ($1 \leq i \leq M$) consists of a communication control section $40_i$, an agent control section $45_i$, amplifying devices $52_i$ and $54_i$, and a shared application section $50_i$. The amplifying devices $52_i$ and $54_i$ can be provided independently, i.e., separately from the PC $22_i$. The network 12 is connected to the agent control section $45_i$ and the shared application section $50_i$ via the communication control section $40_i$. The audio network 13 is connected to the amplifying devices $52_i$ and $54_i$.

Figure 13:
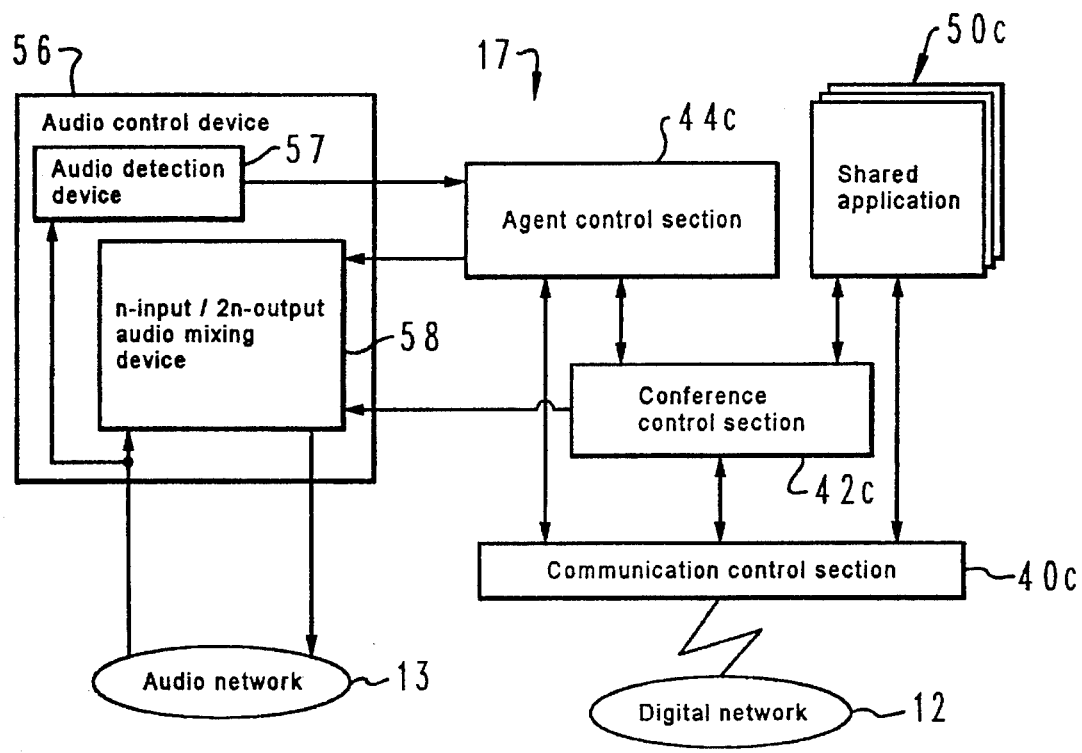
FIG. 13 is a schematic diagram showing the constitution of an central control apparatus of the third embodiment.

As shown in FIG. 13, the central control apparatus 17 consists of a communication control section 40C, a conference control section 42C, an agent control section 44C, a shared application section 50C, and an audio control device 56 having an audio detection device 57, as well as an audio mixing device 58. The communication control section 40C is connected to the network 12 and also connected to the conference control section 42C, agent control section 44C and shared application section 50C. The conference control section 42C is connected to the agent control section 44C and the shared application section 50C. Concerning the audio control device 56, the audio mixing device 58 is connected to the audio network 13 and also connected to the audio detection device 57, conference control section 42C, as well as the agent control section 44C, and the audio detection device 57 is connected to the agent control section 44C.

The audio mixing device 58 mixes multichannel audio signals sent from the user terminal apparatuses and outputs mixed signals. For example, when receiving audio signals from n user terminal apparatuses, the audio mixing device 58 mixes those signals to produce a sound field to be heard by the respective operators in a conference room and sends mixed signals of 2n channels (n channels in the case of monaural signals) to the respective user terminal apparatuses. The mixing ratio to produce the sound field to be heard by the operators is controlled by the agent control section 44C and the conference control section 42C. The audio detection device 57 measures the volumes of the audio signals sent from the respective user terminal apparatuses, and sends the measurement results to the agent control section 44C.

As described above, according to this embodiment, since a virtual conference proceeds using the respective networks for the digital signal and the audio signal which are separated from each other, the audio data can be exchanged independently to thereby reduce the loads of A/D conversion etc., of the user terminal apparatus and the central control apparatus.

Figure 14:
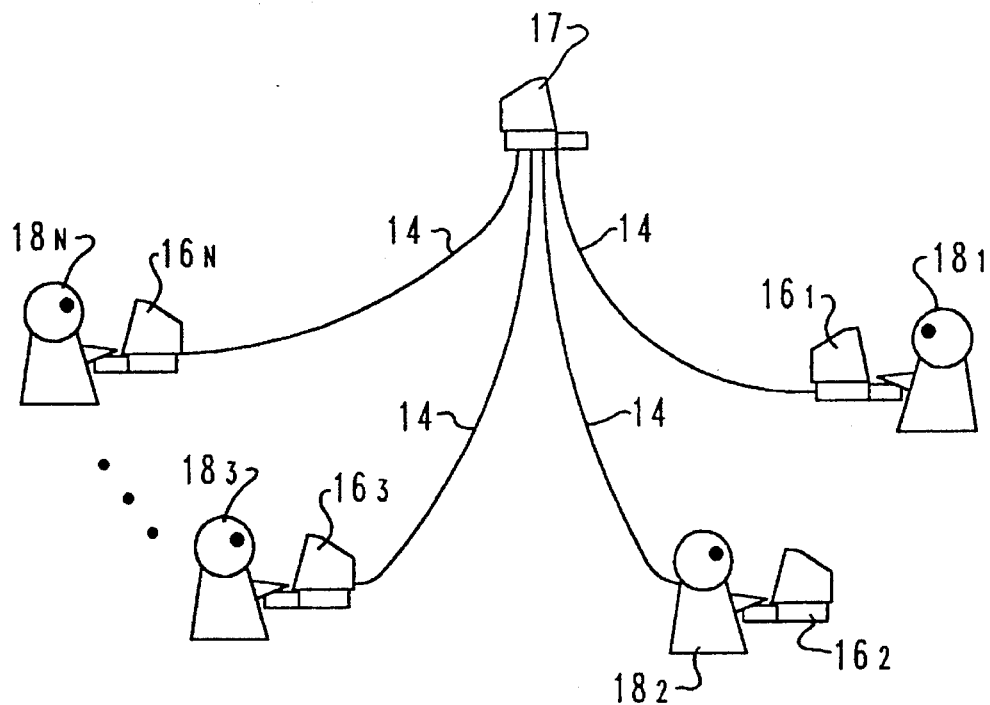
FIG. 14 is a schematic diagram showing the constitution of a virtual conference system according to a fourth embodiment.

A fourth embodiment will be hereinafter described, in which the invention is applied to a telephonic conference using voice. Since the fourth embodiment is generally similar to the above embodiment, only the different portions will be described below. The parts in the fourth embodiment that are the same as the corresponding parts in the above embodiment are given the same reference symbols and detailed descriptions thereof will be omitted. As shown in FIG. 14, a virtual conference system 10 of this embodiment includes N (natural number) user terminal apparatuses $16_1$–$16_N$ connected to an central control apparatus 17 via network such as a public telephone network (an ISDN 64 is used in this embodiment).

Figure 15:
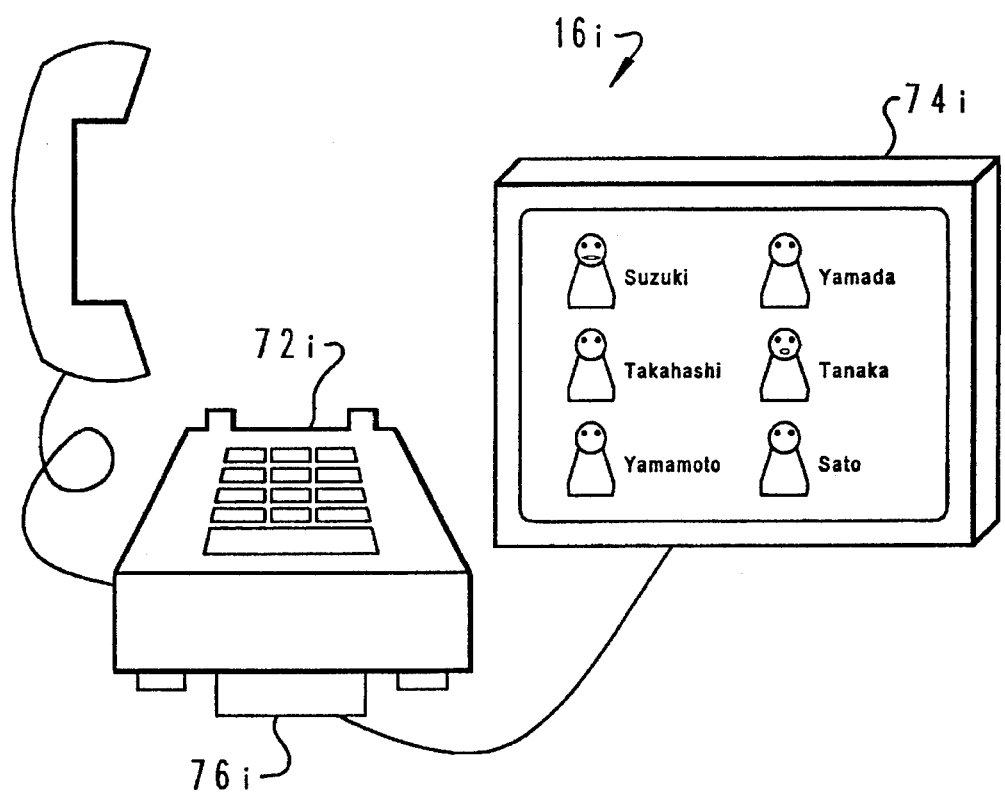
FIG. 15 is a schematic diagram showing the constitution of one user terminal apparatus of the fourth embodiment.
Figure 16:
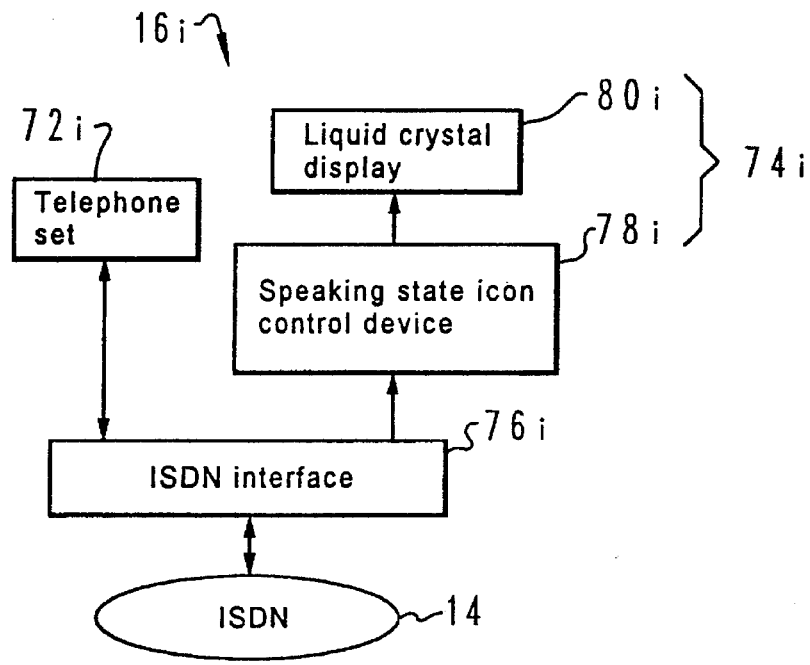
FIG. 16 is a block diagram schematically showing the constitution of one user terminal apparatus of the fourth embodiment.
Figure 17:
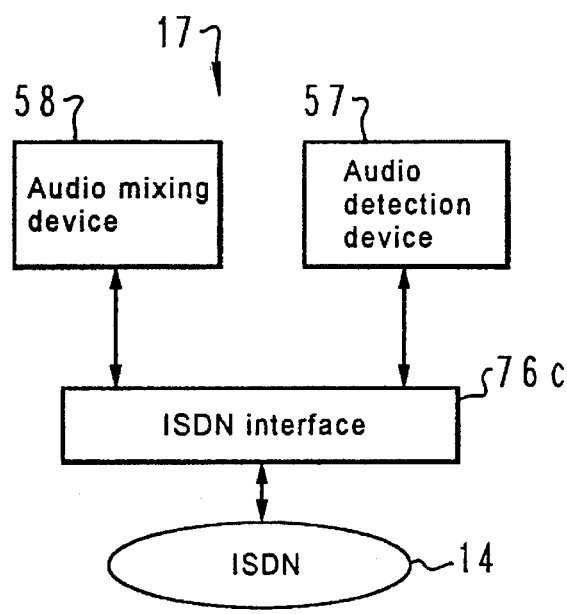
FIG. 17 is a schematic diagram showing the constitution of an central control apparatus of the fourth embodiment.

As shown in FIG. 15, the user terminal apparatus $16_i$ ($1 \leq i \leq N$) consists of a telephone set $72_i$, a display device $74_i$, and an ISDN interface $76_i$ connected to those devices. The display device $74_i$ serves to display conference attendants etc., and consists of a speaking state icon control device $78_i$ and a liquid crystal display $80_i$ (see FIG. 16). The display device $74_i$ displays names of attendants and icons (only displayed in this embodiment) indicating their speaking states. The icons may be lit up with lamps, and may be associated with characters such as "speaking." The central control apparatus 17 consists of an audio detection device 57, an audio mixing device 58, and an ISDN interface 76C connected to those devices (see FIG. 17).

The user terminal apparatus $16_i$ and the central control apparatus 17 may be so constructed that the sending and receiving audio signals are transmitted through separate lines. Alternatively, they may be constructed so that those signals are concurrently transmitted through the same line.

The transmission data having a format of Table 2 below is exchanged between the user terminal apparatus $16_i$ and the central control apparatus 17.

TABLE 2

| Number n of attendants | Name of mth attendant | Speaking state flag of mth attendant | ... |
|---|---|---|---|
| ← Repeated for m = 1 to n → | | | |

The transmission data consists of the number n of attendants, a name of the mth attendant, and a speaking state flag of the mth attendant. The flag is set when while the mth attendant is speaking, and is reset when he is not speaking. Assume the data here to indicate the setting and resetting of the flag to be "1" and "0," respectively. If the number of attendants is six and the fourth attendant is speaking, the transmission data is, for instance, "6: Suzuki, 0: Takahashi, 0: Yamamoto, 0: Yamada, 1: Tanaka, 0: Sato, 0:." Using this transmission data, each user terminal apparatus can display a list of the attendant names and indicate who is speaking.

The audio detection device 57 may be provided in each user terminal apparatus, in which case an identification number of each user terminal apparatus and a flag indicating whether its operator is speaking may be sent from each user terminal apparatus to the central control apparatus 17.

Next, the operation of this embodiment will be described. Each operator connects her user terminal apparatus to the central control apparatus 17 via the ISDN 64. The central control apparatus 17 calls the other user terminal apparatuses or waits for their connections. A plurality of user terminal apparatuses are connected to the central control apparatus 17 and a conference is held. When an operator of a certain user terminal apparatus speaks, the volume of his voice is detected by the audio detection device 57 of the central control apparatus 17. The central control apparatus 17 sequentially sends the transmission data of the above format (see Table 2) to all the user terminal apparatuses. Based on the transmission data sent from the central control apparatus 17, each user terminal apparatus displays a list of attendant names and also displays an icon of a speaking attendant with an indication that the operator is speaking.

As described above, according to this embodiment, even where the number of conference attendants is large or there is an attendant whose voice is not known by the other attendants, the attendants can recognize who is speaking and the attendants can easily understand the state of a conference during its progress.

As described above, according to the invention, the animated characters representing the respective attendants are displayed on the display means, and the patterns of the animated characters being displayed are changed in accordance with the state of a conference. Therefore, the invention can provide a terminal apparatus for a virtual conference system which properly reflects indications of the attendants' intention that are necessary for the progress of a conference.

By using a plurality of terminal apparatuses for a virtual conference system according to the invention, the virtual conference system can be provided in which indications of the attendants' intentions necessary for the progress of a conference are reflected by the animated characters in accordance with the state of the conference, and even with remote attendants a conference can proceed in the same manner as an actual conference of real attendance.

Furthermore, according to the virtual conference system of the invention, since the character pattern is changed in accordance with the state of voice generation by using the audio information, the other attendants can be informed of the state such as a speech of a conference attendant.

While the invention has been particularly shown and described with reference to a preferred embodiment, it will be understood by those skilled in the art that various changes in form and detail may be made therein without departing from the spirit and scope of the invention.

We claim:

1. A terminal apparatus for a virtual conference system, comprising:

a display means for displaying a virtual conference room used for holding a virtual conference, and for displaying, in the virtual conference room, animated characters representing participants at the virtual conference;

an indication means for indicating an action of an animated character representing a particular corresponding participant;

an information output means for outputting action information for the animated character representing the particular corresponding participant indicated by the indication means;

a management means for determining an animated character to be actuated based on input action information for the other animated characters and the indicated action of the animated character representing the particular corresponding participant and for assigning an action right to the determined animated character; and a character control means for actuating the right-assigned animated character in accordance with at least one of the input action information for the other animated characters and the indicated action of the animated character representing the particular corresponding participant.

2. A terminal apparatus for a virtual conference system, comprising:
- a display means for displaying a virtual conference room used for holding a virtual conference, and for displaying, in the virtual conference room, animated characters representing participants at the virtual conference;
- an indication means for indicating an action of an animated character representing a particular corresponding participant;
- an information output means for outputting action information for the animated character representing a particular corresponding participant indicated by the indication means; and
- a character control means for actuating the other animated characters in accordance with input action information for the other animated characters, and for actuating the animated character representing the particular corresponding participant in accordance with the indicated action when receiving permission information corresponding to the output action information.

3. A virtual conference system comprising a plurality of terminal apparatuses connected to each other so that action information can be input to each of the plurality of terminal apparatuses, each terminal apparatus including:
- a display means for displaying a virtual conference room used for holding a virtual conference, and for displaying, in the virtual conference room, animated characters representing participants at the virtual conference;
- an indication means for indicating an action of an animated character representing a particular corresponding participant;
- an information output means for outputting action information for the animated character representing the particular corresponding participant indicated by the indication means;
- a management means for determining an animated character to be actuated based on input action information for the other animated characters and the indicated action of the animated character representing the particular corresponding participant and for assigning an action right to the determined animated character; and
- a character control means for actuating the right-assigned animated character in accordance with at least one of the input action information for the other animated characters and the indicated action of the animated character representing the particular corresponding participant.

4. A virtual conference system comprising a plurality of terminal apparatuses connected to an intensive control apparatus which determines an animated character to be actuated in accordance with input action information, and sending permission information to a terminal apparatus for a virtual conference system corresponding to the determined animated character, each terminal apparatus including:
- a display means for displaying a virtual conference room used for holding a virtual conference, and for displaying, in the virtual conference room, animated characters representing participants at the virtual conference;
- an indication means for indicating an action of an animated character representing a particular corresponding participant;
- an information output means for outputting action information for the animated character representing the particular corresponding participant indicated by the indication means; and
- a character control means for actuating the other animated characters in accordance with input action information for the other animated characters, and for actuating the animated character representing the particular corresponding participant in accordance with the indicated action when receiving permission information corresponding to the output action information.

5. A terminal apparatus for a virtual conference system, comprising:
- a display means for displaying a virtual conference room used for holding a virtual conference, and for displaying, in the virtual conference room, animated characters representing participants at the virtual conference;
- an indication means for indicating an action of an animated character representing a particular corresponding participant;
- an information output means for converting an input voice to voice information for the animated character representing the particular corresponding participant, and for outputting the voice information together with the action information for the animated character representing the particular corresponding participant indicated by the indication means;
- a voice output means for judging whether to output a voice based on input action information for the other animated characters, and for outputting the voice based on the voice information when it is judged that the voice should be output; and
- a character control means for actuating the other animated characters in accordance with the input action information for the other animated characters, and for actuating the animated character representing the particular corresponding participant in accordance with the indicated action.

6. A virtual conference system comprising a plurality of terminal apparatuses connected to each other so that the voice information and the action information can be input to each of the plurality of terminal apparatuses, each terminal apparatus including:
- a display means for displaying a virtual conference room used for holding a virtual conference, and for displaying, in the virtual conference room, animated characters representing participants at the virtual conference;
- an indication means for indicating an action of an animated character representing the particular corresponding participant;
- an information output means for converting an input voice to voice information for the animated character representing the particular corresponding participant, and for outputting the voice information together with the action information for the animated character representing the particular corresponding participant indicated by the indication means;
- a voice output means for judging whether to output a voice based on input action information for the other animated characters, and for outputting the voice based on the voice information when it is judged that the voice should be output; and
- a character control means for actuating the other animated characters in accordance with the input action information for the other animated characters, and for actuating the animated character representing the particular corresponding participant in accordance with the indicated action.

* * * * *